United States Patent
Zhang et al.

(10) Patent No.: US 8,521,207 B2
(45) Date of Patent: Aug. 27, 2013

(54) CLOSED-LOOP POWER CONTROL IN MULTI-CARRIER HIGH-SPEED UPLINK PACKET ACCESS

(75) Inventors: Danlu Zhang, San Diego, CA (US); Pavan Kumar Vitthaladevuni, San Diego, CA (US); Ravi Agarwal, San Diego, CA (US); Jilei Hou, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 12/702,121

(22) Filed: Feb. 8, 2010

(65) Prior Publication Data

US 2010/0202331 A1 Aug. 12, 2010

Related U.S. Application Data

(60) Provisional application No. 61/150,942, filed on Feb. 9, 2009.

(51) Int. Cl.
*H04W 52/30* (2009.01)
*H04B 7/00* (2006.01)

(52) U.S. Cl.
USPC ........ 455/522; 455/69; 455/67.11; 455/452.2

(58) Field of Classification Search
USPC ................. 455/522, 69, 3.01, 434, 13.4, 515, 455/67.11, 452.1, 452.2; 370/310, 252, 329, 370/328, 338
See application file for complete search history.

(56) References Cited

U.S. PATENT DOCUMENTS

| 5,790,555 | A  | * | 8/1998  | Narahashi et al. | 370/480 |
| 8,422,434 | B2 |   | 4/2013  | Vijayan et al.   |         |
| 2004/0109511 | A1 | * | 6/2004  | Lee           | 375/296 |
| 2006/0270431 | A1 | * | 11/2006 | Yoshi         | 455/522 |
| 2010/0195507 | A1 | * | 8/2010  | Marinier et al. | 370/242 |

FOREIGN PATENT DOCUMENTS

| CN | 1802798 A    | 7/2006 |
| CN | 1836392 A    | 9/2006 |
| EP | 1655868 A1   | 5/2006 |
| EP | 1793509 A1   | 6/2007 |
| RU | 2006108531 A | 7/2006 |
| RU | 2007104353 A | 8/2008 |
| WO | 2005018125 A1| 2/2005 |
| WO | 2006003761 A1| 1/2006 |

OTHER PUBLICATIONS

International Search Report and Written Opinion—PCT/US2010/023662—ISA/EPO—Jun. 21, 2010.

(Continued)

*Primary Examiner* — John J Lee
(74) *Attorney, Agent, or Firm* — Charles Chesney

(57) ABSTRACT

A method for wireless communications is provided. The method includes applying independent power controls to two or more carriers from a set of high speed packet access signals. The method includes monitoring power across the two or more carriers to determine power levels for the set of high speed packet access signals. The method also includes automatically adjusting at least one of the independent power controls in view of the determined power levels for the set of high speed packet access signals.

28 Claims, 11 Drawing Sheets

(56) References Cited

OTHER PUBLICATIONS

Ericsson: "DC-HSUPA power scaling" 3GPP Draft; R1-091894 DC-HSUPA Power Scaling, 3rd Generation Partnership Project (3GPP), Mobile Competence Centre ; 650, Route Des Lucioles ; F-06921 Sophia-Antipolis Cedex ; France, No. San Francisco, USA; Apr. 28, 2009, XP050339385.

Taiwan Search Report—TW099104074—TIPO—Jan. 17, 2013.

* cited by examiner

CLOSED-LOOP POWER CONTROL IN MULTI-CARRIER HIGH-SPEED UPLINK PACKET ACCESS

CLAIM OF PRIORITY UNDER 35 U.S.C. §119

This application claims the benefit of U.S. Provisional Patent Application No. 61/150,942, entitled USER EQUIPMENT POWER CONTROL WITH MULTIPLE CARRIERS, and filed on Feb. 9, 2009, the entirety of which is incorporated herein by reference.

BACKGROUND

I. Field

The following description relates generally to wireless communications systems, and more particularly to independent power control of multiple carriers for High-Speed Uplink Packet Access (HSUPA).

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

One issue with wireless systems relates to multicarrier controls for high-speed uplink packet access (HSUPA). In general, HSUPA employs a packet scheduler, but operates on a request-grant principle where user equipment or devices can request permission to send data and a scheduler decides when and how many devices will be allowed to do so. A request for transmission contains data about the state of the transmission buffer and queue at the device and its available power margin. In addition to this scheduled mode of transmission applicable standards also allow a self-initiated transmission mode from the devices, denoted non-scheduled. With respect to transmitted power and multicarrier control however, previous systems were only able to achieve such control via power controls that were universally applied to all carriers. This type of non-independent control over the carriers made it difficult to regulate power among the carriers and control interference between devices and/or channels. Moreover, in addition to non-independent control, multicarrier control systems did not have the capability to properly scale power allocations between carriers when conditions dictated. Such lack of control independence and scaling made it exceedingly difficult to deliver the quality of service desired.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to control power settings across multiple wireless carriers in an independent manner for high-speed packet access networks. In one aspect, a power control method for wireless carriers is provided, where independent closed-loop controls can be applied to one or more carriers of a multicarrier set. The method includes responding to power up and power down commands across multiple carriers and dividing allowed power allocation across at least two wireless carriers in response to the power up and power down commands. In another aspect, the method includes ranking the carrier channels in a sequential manner according to a preference and assigning power to the channels according to the ranking. In one example, the ranking can be based off of a signal quality parameter. In yet another aspect, the method includes analyzing power properties across the group of carrier channels in a parallel manner and assigning power to the channels according to the properties of the group. Dynamic ranking and power analysis can be applied where channels are evaluated over time and ranked or assigned power based on the evaluation or monitoring.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to control power across multiple carriers in a wireless network. In one aspect, a method for wireless communications is provided. The method includes applying independent power controls to two or more carriers from a set of high speed packet access signals. The method includes monitoring power across the two or more carriers to determine power levels for the set of high speed packet access signals. The method also includes automatically adjusting at least one of the independent power controls in view of the determined power levels for the set of high speed packet access signals.

It is noted that in one or more exemplary embodiments described herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 1:
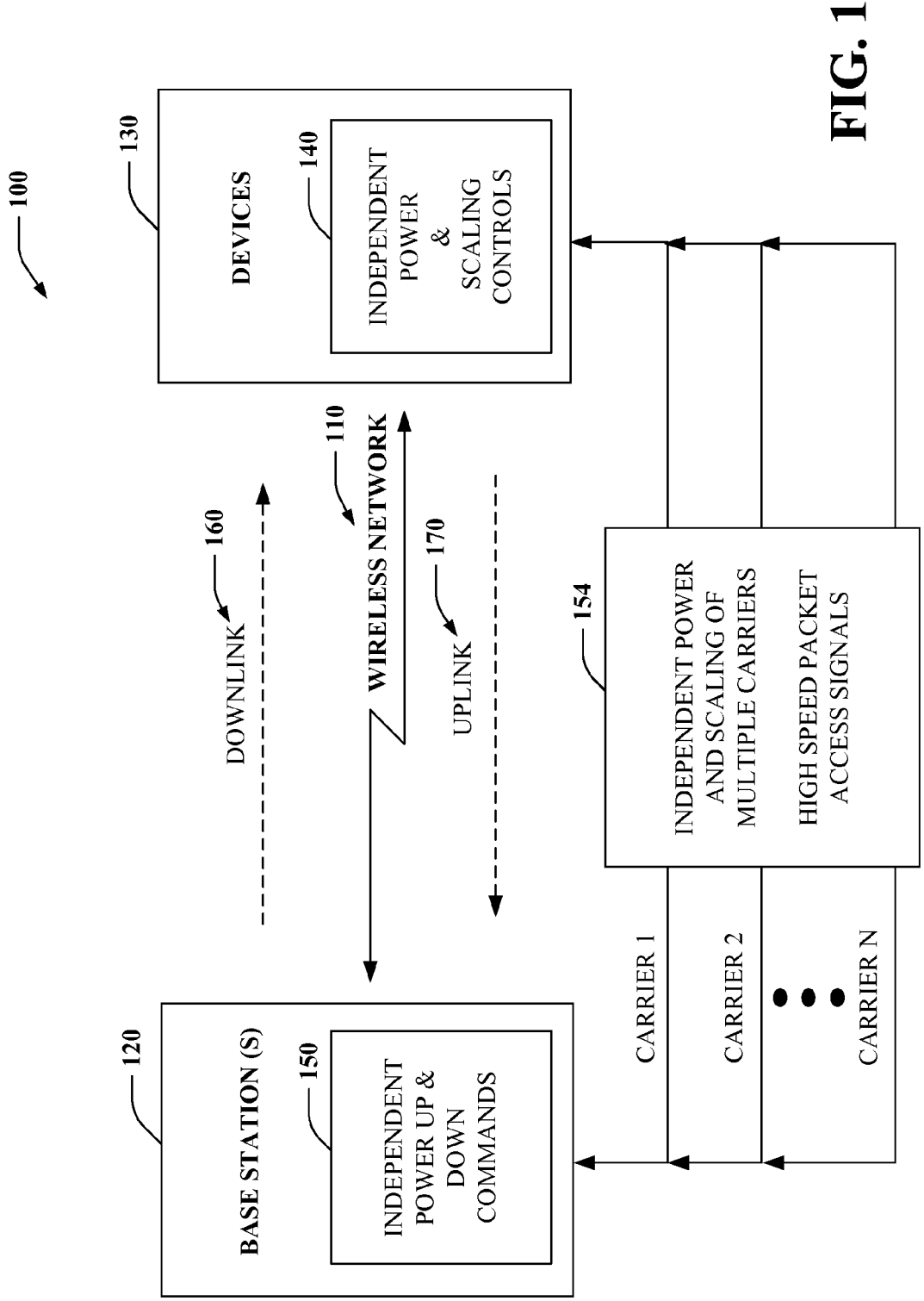
FIG. 1 is a high level block diagram of a system that provides independent multicarrier power control for a wireless communications system.

Referring now to FIG. 1, a system 100 provides multicarrier power control for a wireless communications network 110, where closed loop controls are employed to regulate transmit power of user equipment in an independent manner between multiple carriers. The system 100 includes one or more base stations 120 (also referred to as a node, evolved node B—eNB, serving eNB, target eNB, femto station, pico station) which can be an entity capable of communication over the wireless network 110 to various devices 130. For instance, each device 130 can be an access terminal (also referred to as terminal, user equipment, mobility management entity (MME) or mobile device). The device 130 can include independent power and scaling controls 140 that are provided to manage power across multiple wireless carriers. Such controls 140 respond to power up or down commands 150 emanating from the base station 120. For instance, at 154, various carriers may be generated that are independently controlled by the controls 140 (e.g., each carrier having separate closed loop control).

As shown, the base station 120 communicates to the device 130 (or devices) via downlink 160 and receives data via uplink 170. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the power control described herein. It is further noted that although the controls 140 typically apply to a high speed uplink packet access (HSUPA) systems, such controls can also apply to high speed downlink packet access (HSDPA) or other wireless protocols as well.

In general, the controls 140 regulate power settings across multiple wireless carriers in an independent manner for high-speed packet access networks. In one aspect, a power control method for wireless carriers is provided, where independent closed-loop controls 140 can be applied to one or more carriers of a multicarrier set. The method includes responding to power up and power down commands 150 across multiple carriers and dividing allowed power allocation across at least two wireless carriers in response to the power up and power down commands. In another aspect, the method includes ranking the carrier channels in a sequential manner according to a preference and assigning power to the channels according to the ranking. In one example, the ranking can be based off of a signal quality parameter. In yet another aspect, the method includes analyzing power properties across the group of carrier channels in a parallel manner and assigning power to the channels according to the properties of the group. Dynamic ranking and power analysis can be applied where channels are evaluated over time and ranked or assigned power based on the evaluation or monitoring.

Generally, rules or policies should be specified with multiple carriers for power scaling when the UE or device 130 does not have enough power to obey power control 'up' commands at 150. Typically, the UE 130 first combines radio power control (RPC) commands from the cells in its active set. If the command is 'up' and the UE 130 does not have the power to support it, power scaling is applied. Generally, enhanced dedicated physical dedicated channel (E-DPDCH) power is first reduced where other powers are scaled equally such that the ratios among them are maintained, and where RPC is independent on each carrier. Rules for scaling E-DPDCH can be applied where the UE 130 statically divides its maximum transmit power among carriers in one aspect.

In another aspect, greedy filling algorithms can be applied where the carriers are ordered by preference which could depend on channel quality, grant, current data rates and status of anchor or non-anchor carriers, for example. Generally, the 'down' command at 150 is applied first where the carriers with the 'up' command can receive transmit power at least unchanged. The remaining power can be computed and distributed among the carriers with 'up' command. Transmit power on each carrier can be computed sequentially to fill the power on the carriers of choice which is determined by the above preferences. The available power can be used by the current carrier under consideration.

In yet another aspect, a joint filling algorithm can be applied where the transmit powers are computed in a joint manner across channels. Optimization techniques can be applied. One example is a water-filling scheme. Generally, a 'down' command at 150 is applied first and carriers with the 'up' command will received transmit power at least unchanged. The remaining power is computed and distributed among the carriers with 'up' command. Transmit power on each carrier is computed in a joint manner. For example, if maximum data rate is the objective, a water-filling technique can be applied. The water-filling algorithm can assign more power to sub-channels which experience good conditions and may assign lesser or no power to poorly conditioned sub-channels, for example.

As noted previously, the system 100 supports a method for wireless communications that includes applying independent power controls 140 to two or more carriers from a set of high speed packet access signals. This includes monitoring power across the two or more carriers to determine power levels for the set of high speed packet access signals and automatically adjusting at least one of the independent power controls in view of the determined power levels for the set of high speed packet access signals. The independent power controls are incrementally controlled as an up or down control 150, where up represents an increase in power and down represents a decrease in power. The system 100 and method include statically dividing power across the two or more carriers, where the independent power controls are applied in accordance with a high speed uplink packet access network (HSUPA), a high speed downlink packet access network (HSDPA), an enhanced data channel (E-DCH), an enhanced dedicated physical data channel (E-DPDCH), or high speed dedicated physical data channel (HS-DPDCH). This includes ordering the two or more carriers in a sequential manner and sequentially controlling power levels among the two or more carriers.

The method can also include scaling the two or more carriers in a sequential manner such as ordering the two or more carriers according to a preference that includes a channel quality parameter, a grant, a current data rate, a status of an anchor carrier, or a status of a non-anchor carrier. The method can also include applying a down command before controlling power levels between the two or more carriers and computing and distributing power among the two or more carriers having an up command. This includes sequentially filling power on the two or more carriers according to the preference.

The method also includes computing power across the two or more carriers in a parallel manner and jointly controlling power levels across the two or more carriers. This can include scaling the power levels across the two or more carriers in a parallel manner and applying a down command before controlling power levels between the two or more carriers. The method also includes computing and distributing power among the two or more carriers having an up command and computing a maximum data rate and distributing power across the two or more carriers according to a water-filling algorithm, for example.

It is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
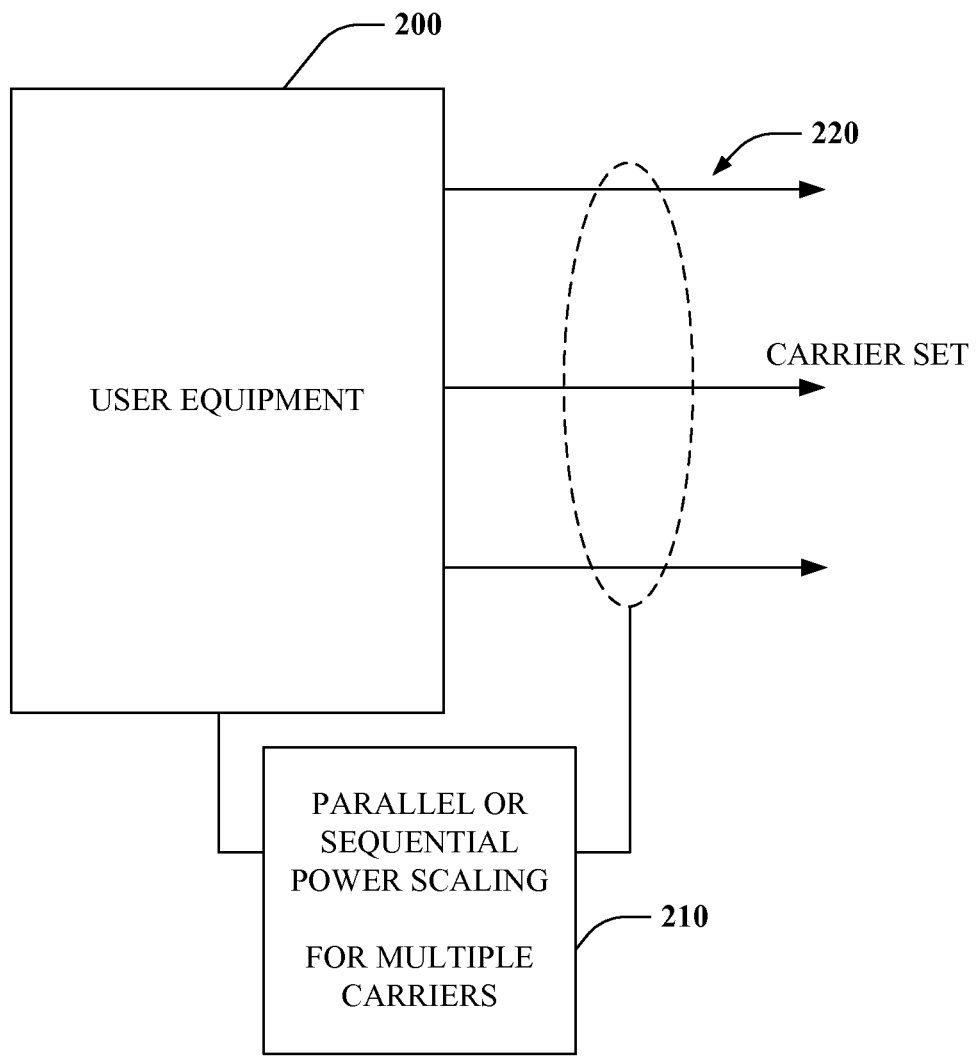
FIG. 2 is a diagram that illustrates power scaling for a multicarrier power control in a wireless communications system.

Referring now to FIG. 2, power scaling is illustrated for a multicarrier wireless system. In this aspect, user equipment 200 is shown, where power scaling 210 is applied to a multiple carrier set 220. Generally, even though all (or some) of the carriers in the set have received a "down" command, it is still possible that the user equipment 200 has exceeded a maximum allowable power output level such as can be determined by predetermined thresholds that are monitored and acted upon by the closed loop controls described above. In case where power thresholds have been exceeded, power scaling 210 can be applied to control the aggregate power of the multicarrier set 220.

Figure 3:
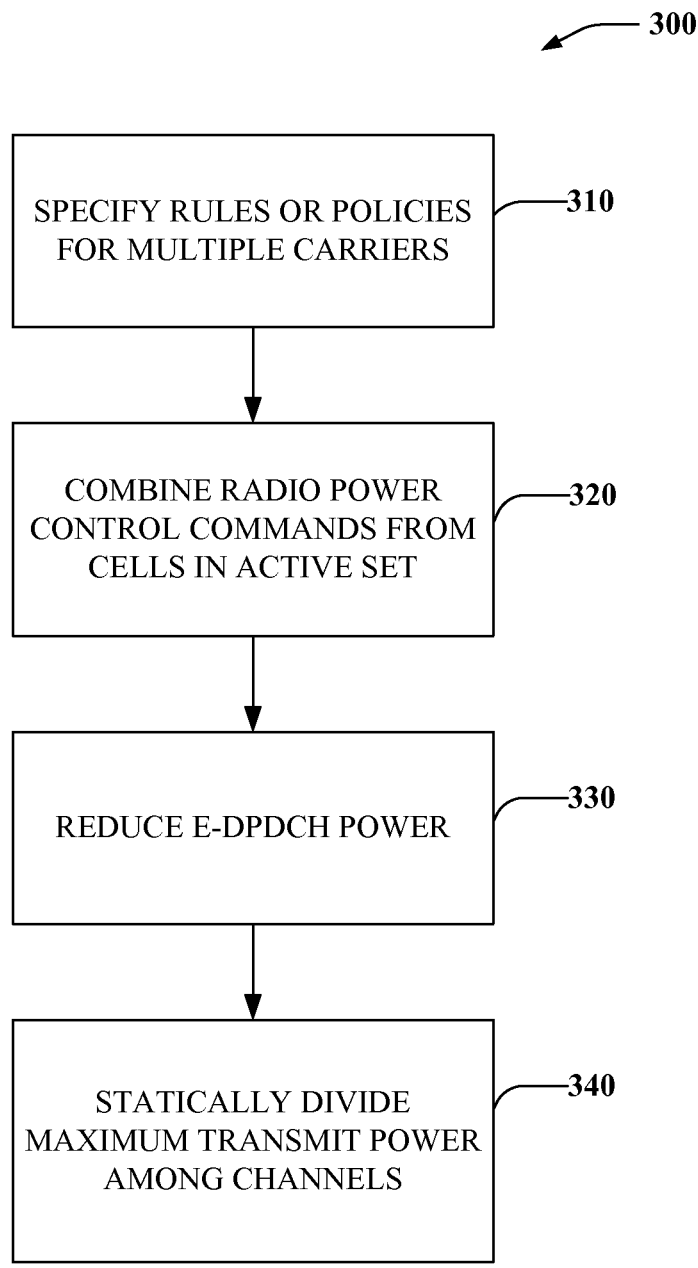
FIGS. 3-5 illustrate example power control methods for a wireless communication system.
Figure 4:
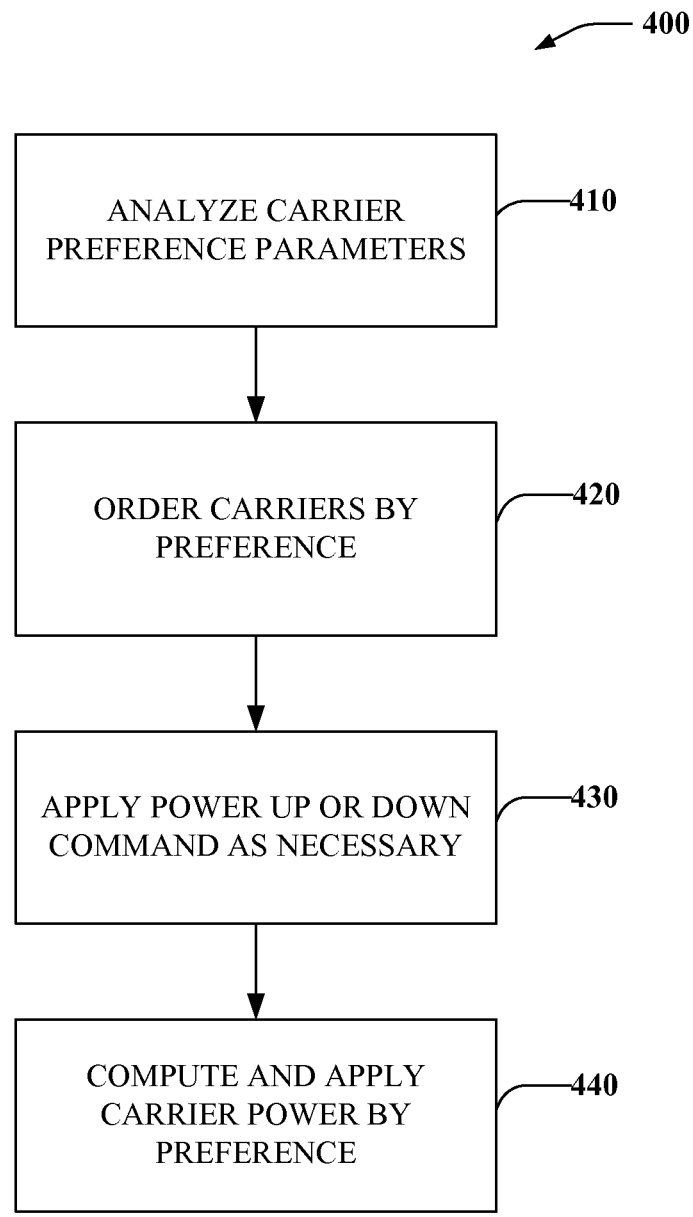
Figure 5:
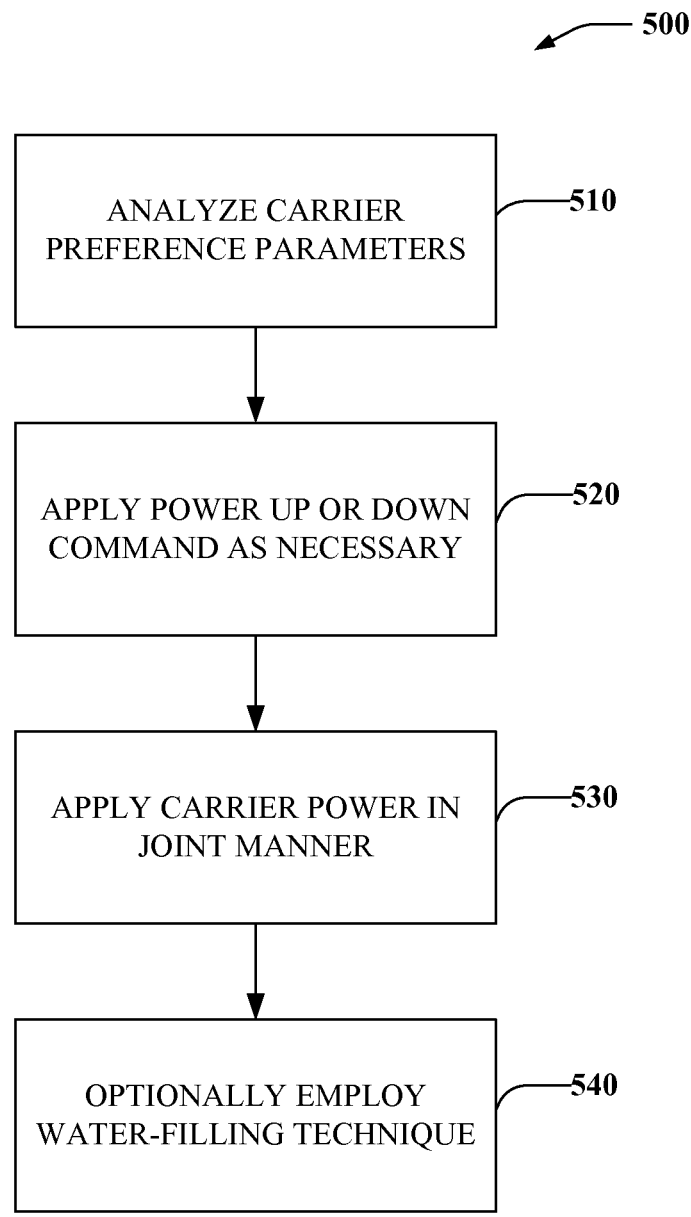

Referring now to FIG. 3-5, example independent power control methodologies are illustrated. While, for purposes of simplicity of explanation, the methodologies (and other methodologies described herein) are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the methodologies can be implemented as processor instructions, logical programming functions, or other electronic sequence that supports independent multicarrier power control described herein.

Proceeding to 310 of FIG. 3, rules or policies can be specified with multiple carriers for power scaling when the UE or device does not have enough power to obey power control 'up' commands. At 320, the UE or device combines radio power control (RPC) commands from the cells in its active set. If the command is 'up' and the UE does not have the power to support it, power scaling is applied. At 330, enhanced dedicated physical dedicated channel (E-DPDCH) power can be reduced where other powers are scaled about equally such that the ratios among them are maintained, and where RPC is independent on each carrier. At 340, rules for scaling E-DPDCH can be applied where the UE statically divides its maximum transmit power among carriers from a multiple carrier subset in one aspect.

Proceeding to FIG. 4, a sequential method 400 for power control is described. In this aspect, greedy filling algorithms can be applied where the carriers are ordered by preference. At 410, one or more preference parameters are analyzed. Such parameters can depend on channel quality, grant, current data rates and status of anchor or non-anchor carriers, for example. At 420, based on the analysis at 410, the respective carriers are ordered by preference. At 430, power up or down commands are applied as necessary. For instance, the 'down' command can be applied first where the carriers with the 'up' command can receive transmit power at least unchanged. The remaining power can be computed and distributed among the carriers with 'up' command. At 440, transmit power on each carrier can be computed and applied sequentially to fill the power on the carriers of choice which is determined by the above preferences. The available power can be used by the current carrier under consideration.

Proceeding to FIG. 5, a joint filling algorithm can be determined at 510 where the transmit powers are computed in a joint manner across channels. At 520, apply power up or down commands as necessary. For example, a 'down' command can be applied first and carriers with the 'up' command can received transmit power at least unchanged. The remaining power can be computed and distributed among the carriers with 'up' command. At 530, transmit power on each carrier is applied computed in a joint manner. At 540, optional optimization techniques can be applied. One example is a water-filling scheme. For example, if maximum data rate is the objective, a water-filling technique can be applied at 540. The water-filling algorithm can assign more power to sub-channels which experience good conditions and may assign lesser or no power to poorly conditioned sub-channels, for example.

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
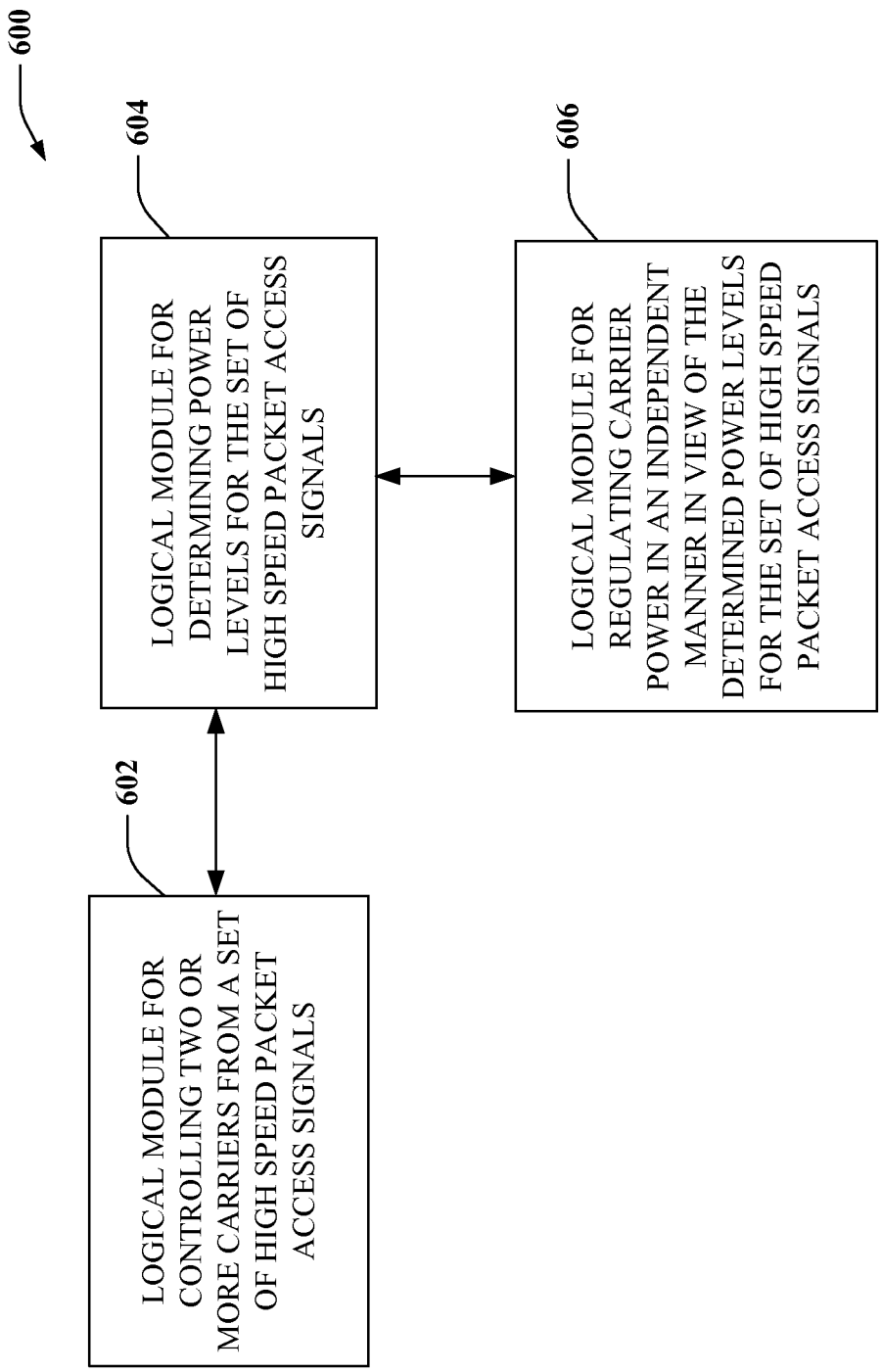
FIG. 6 illustrates an example logical module for multicarrier power control.
Figure 7:
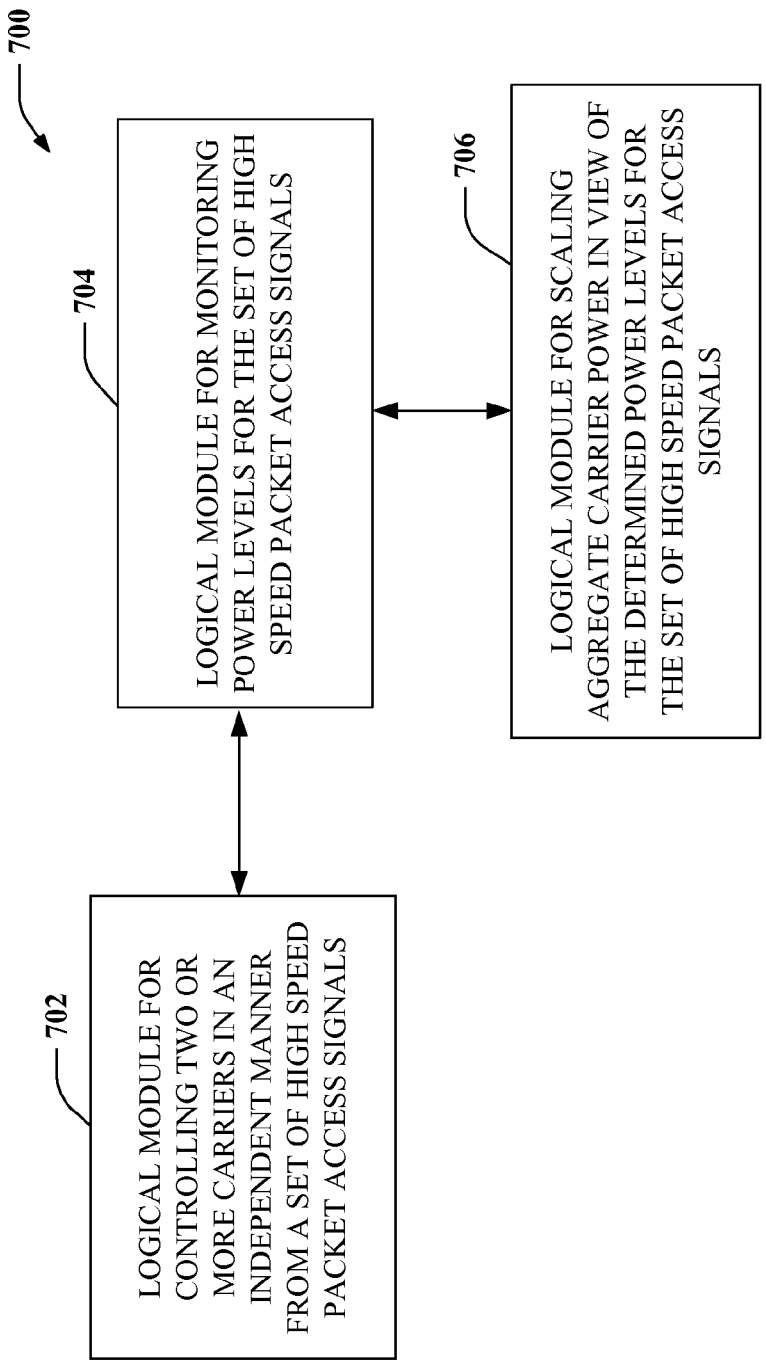
FIG. 7 illustrates an example logical module for alternative multicarrier power control.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 or means for controlling two or more carriers from a set of high speed packet access signals. This includes a logical module 604 or means for determining power levels for the set of high speed packet access signals. This also includes a logical module 606 or means for regulating carrier power in an independent manner in view of the determined power levels for the set of high speed packet access signals.

Referring to FIG. 7, a wireless communication system 700 is provided. The system 700 includes a logical module 702 or means for controlling two or more carriers in an independent manner from a set of high speed packet access signals. This includes a logical module 704 or means for monitoring power levels for the set of high speed packet access signals. This also includes a logical module 706 or means for scaling aggregate carrier power in view of the determined power levels for the set of high speed packet access signals.

In another aspect, a communications apparatus is provided. This includes a memory that retains instructions for providing independent power controls to two or more carriers from a set of high speed packet access signals, determining power across the two or more carriers to determine power levels for the set of high speed packet access signals, and adjusting at least one of the independent power controls in view of the determined power levels for the set of high speed packet access signals; and a processor that executes the instructions.

In another aspect, a computer program product is provided. This includes a computer-readable medium that includes code for controlling power, the code comprising: code for causing a computer to control power for two or more carriers from a set of high speed packet access signals; code for causing a computer to monitor power across the two or more carriers to determine power levels for the set of high speed packet access signals; and code for causing a computer to adjust at least one of the independent power controls in view of the determined power levels for the set of high speed packet access signals.

In another aspect, a method for wireless communications is provided. This includes providing independent power controls for two or more carriers from a set of high speed packet access signals; monitoring power across the two or more carriers to determine power levels for the set of high speed packet access signals; and automatically scaling at least one of the independent power controls in view of the determined power levels for the set of high speed packet access signals.

In yet another aspect, a communications apparatus is provided. This includes a memory that retains instructions for providing independent power controls to two or more carriers from a set of high speed packet access signals, determining power across the two or more carriers to determine power levels for the set of high speed packet access signals, and scaling the independent power controls in view of the determined power levels for the set of high speed packet access signals; and a processor that executes the instructions.

In yet another aspect, a computer program product is provided. This includes a computer-readable medium that includes code for controlling power, the code comprising: code for causing a computer to control power for two or more carriers from a set of high speed packet access signals; code for causing a computer to monitor power across the two or more carriers to determine power levels for the set of high speed packet access signals; and code for causing a computer to collectively scale power for the two or more carriers in view of the determined power levels for the set of high speed packet access signals. This also includes processing for a group of carriers. This includes sequential controls, a set of packet access signals, or a set of packet access signals, determining power, and so forth.

Figure 8:
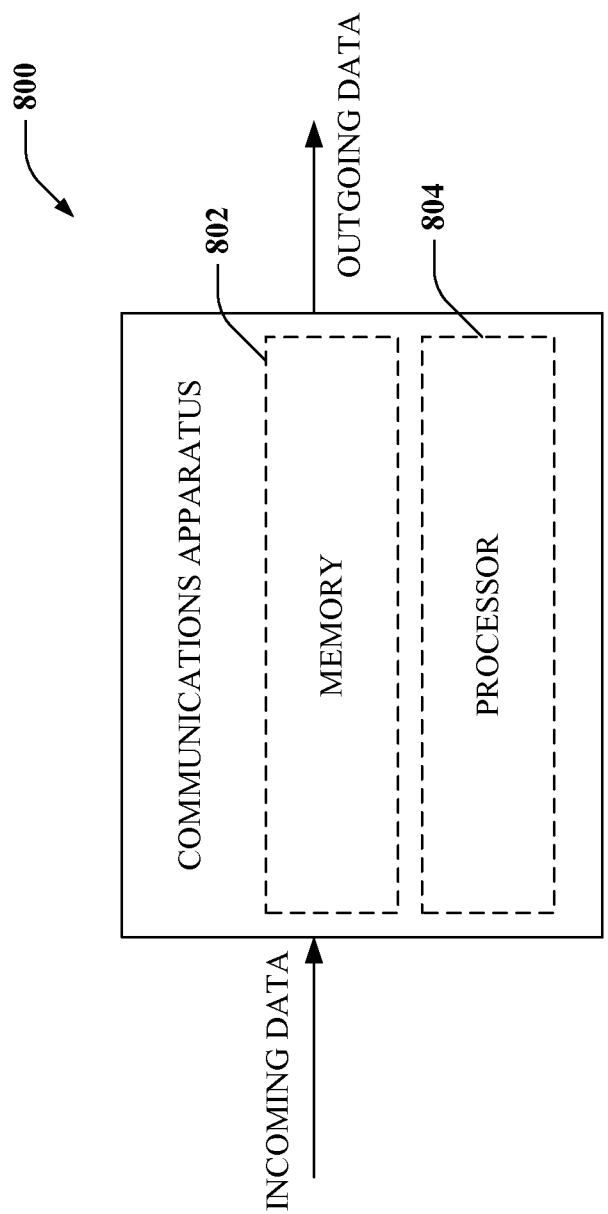
FIG. 8 illustrates an example communications apparatus that employ multicarrier power control.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
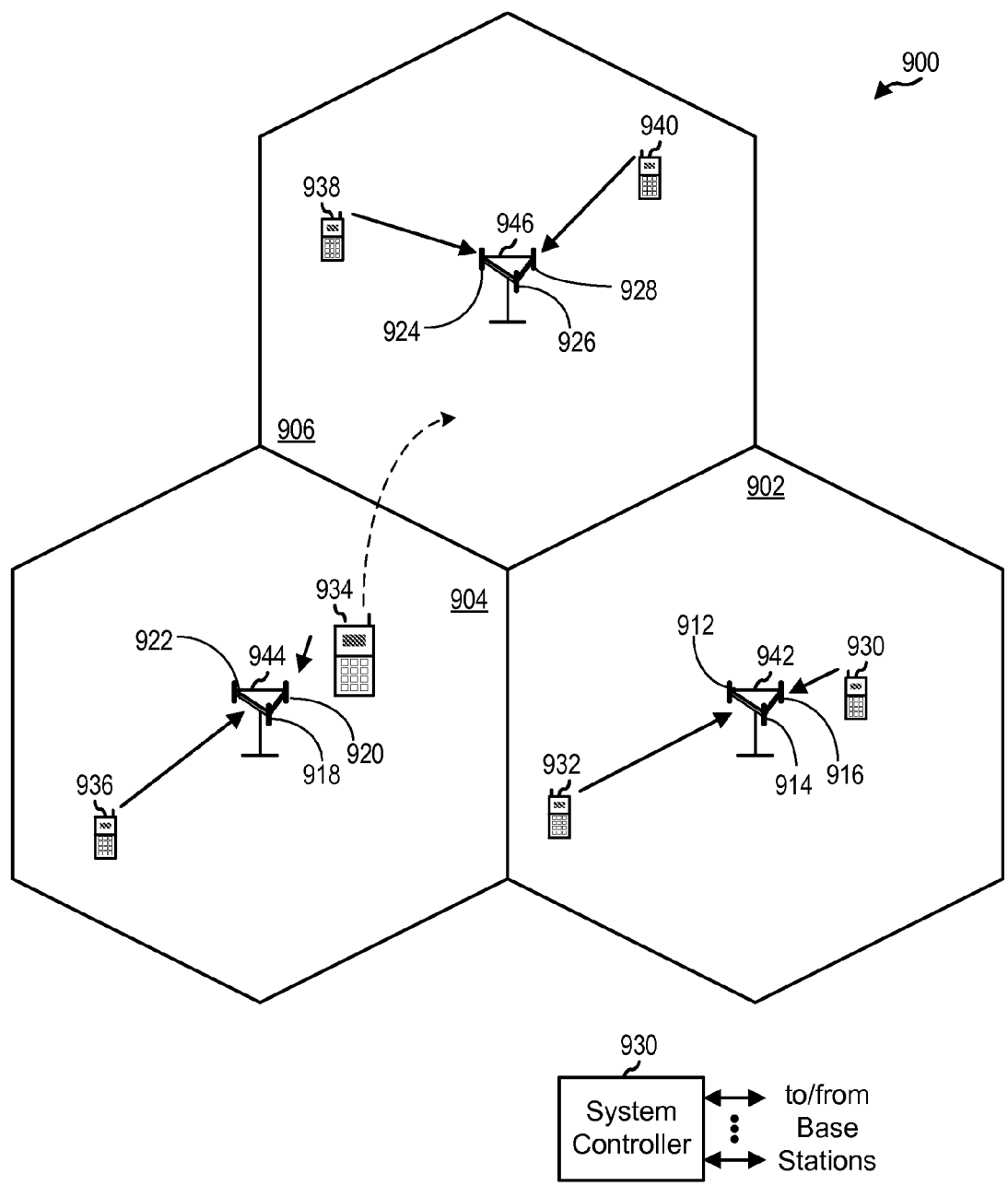
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
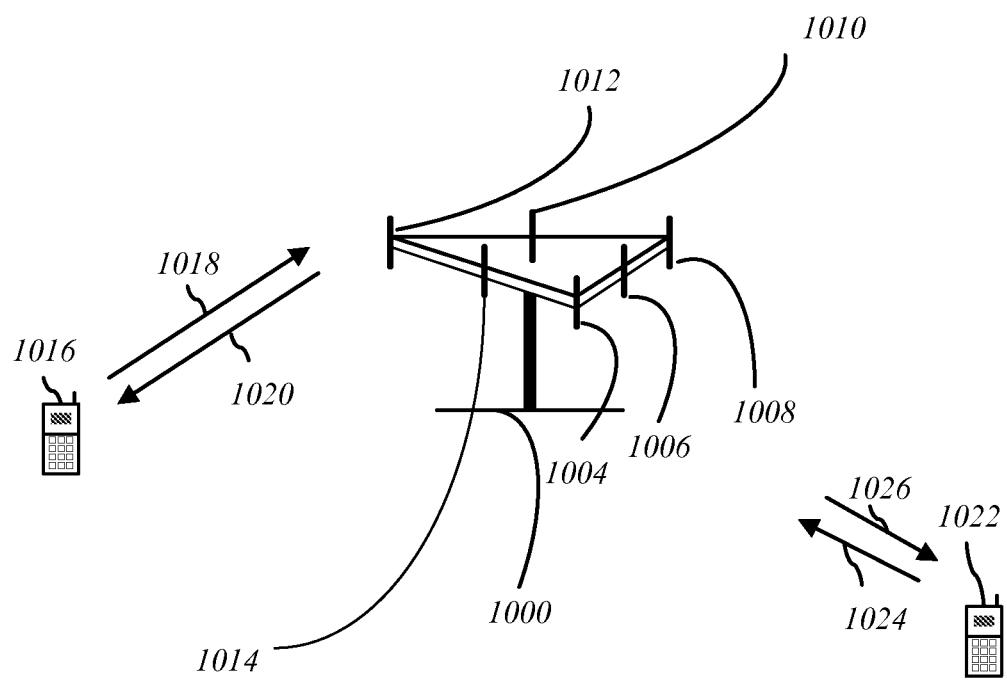
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
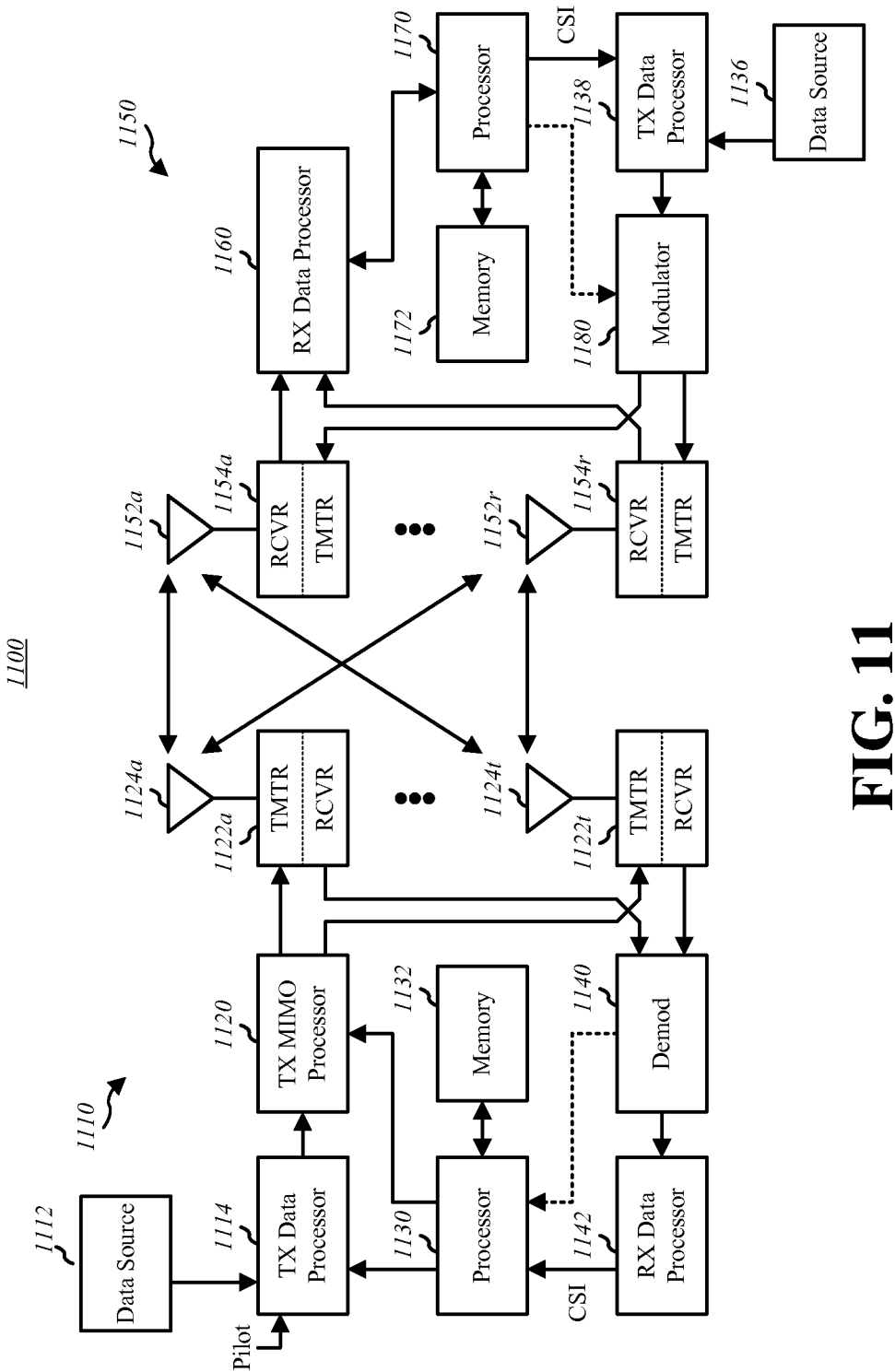

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110. Parameters include resource allocation parameters, interference condition parameters, signal strength parameters, signal quality parameters, quality.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
   applying independent power controls to two or more carriers from a set of packet access signals;
   monitoring power across the two or more carriers to determine power levels for the set of packet access signals; and
   automatically adjusting at least one of the independent power controls in view of the power levels for the set of packet access signals,
   wherein a total power level across the two or more carriers does not exceed a maximum transmit power level.

2. The method of claim 1, the independent power controls are incrementally controlled as an up or down control, where up represents an increase in power and down represents a decrease in power.

3. The method of claim 1, further comprising statically dividing power across the two or more carriers.

4. The method of claim 1, the independent power controls are applied in accordance with a high speed uplink packet access network (HSUPA), a high speed downlink packet access network (HSDPA), an enhanced data channel (E-DCH), an enhanced dedicated physical data channel (E-DPDCH), or high speed dedicated physical data channel (HS-DPDCH).

5. The method of claim 1, further comprising ordering the two or more carriers in a sequential manner and sequentially controlling power levels among the two or more carriers.

6. The method of claim 5, further comprising scaling the two or more carriers in a sequential manner.

7. The method of claim 5, further comprising ordering the two or more carriers according to a preference that includes a channel quality parameter, a grant, a current data rate, a status of an anchor carrier, or a status of a non-anchor carrier.

8. The method of claim 7, further comprising sequentially filling power on the two or more carriers according to the preference.

9. The method of claim 5, further comprising applying a down command before controlling power levels between the two or more carriers.

10. The method of claim 9, further comprising computing and distributing power among the two or more carriers having an up command.

11. The method of claim 1, further comprising computing power across the two or more carriers in a parallel manner and jointly controlling power levels across the two or more carriers.

12. The method of claim 11, further comprising scaling the power levels across the two or more carriers in a parallel manner.

13. The method of claim 11, further comprising applying a down command before controlling power levels between the two or more carriers.

14. The method of claim 11, further comprising computing and distributing power among the two or more carriers having an up command.

15. The method of claim 14, further comprising computing a maximum data rate and distributing power across the two or more carriers according to a water-filling algorithm.

16. A communications apparatus, comprising:
   a memory that retains instructions for providing independent power controls to two or more carriers from a set of packet access signals, determining power across the two or more carriers to determine power levels for the set of packet access signals, and adjusting at least one of the independent power controls in view of the power levels for the set of packet access signals, wherein a total power level across the two or more carriers does not exceed a maximum transmit power level; and
   a processor that executes the instructions.

17. The communications apparatus of claim 16, further comprising ordering the two or more carriers in a sequential manner and sequentially controlling power levels among the two or more carriers.

18. The communications apparatus of claim 17, further comprising scaling the two or more carriers in a sequential manner.

19. The communications apparatus of claim 17, further comprising ordering the two or more carriers according to a preference that includes a channel quality parameter, a grant, a current data rate, a status of an anchor carrier, or a status of a non-anchor carrier.

20. The communications apparatus of claim 19, further comprising sequentially filling power on the two or more carriers according to the preference.

21. The communications apparatus of claim 16, further comprising computing power across the two or more carriers in a parallel manner and jointly controlling power levels across the two or more carriers.

22. The communications apparatus of claim 21, further comprising scaling the power levels across the two or more carriers in a parallel manner.

23. The communications apparatus of claim 22, further comprising computing a maximum data rate and distributing power across the two or more carriers according to a water-filling algorithm.

24. A communications apparatus, comprising:
means for applying independent power controls to two or more carriers from a set of packet access signals;
means for determining power levels for the set of packet access signals; and
means for adjusting at least one of the independent power controls in view of the power levels for the set of packet access signals,
wherein a total power level across the two or more carriers does not exceed a maximum transmit power level.

25. The communications apparatus of claim 24, further comprising a component to order the two or more carriers in a sequential manner and sequentially controlling power levels among the two or more carriers.

26. The communications apparatus of claim 24, further comprising a component to determine power across the two or more carriers in a parallel manner and jointly controlling power levels across the two or more carriers.

27. A computer program product, comprising:
a non-transitory computer-readable medium that includes code for controlling power, the code comprising:
code for causing a computer to apply independent power controls to two or more carriers from a set of packet access signals;
code for causing the computer to monitor power across the two or more carriers to determine power levels for the set of packet access signals; and
code for causing the computer to adjust at least one of the independent power controls in view of the power levels for the set of packet access signals,
wherein a total power level across the two or more carriers does not exceed a maximum transmit power level.

28. The computer program product of claim 27, further comprising code for causing the computer to scale power for a group of carriers in a sequential or a parallel manner.

* * * * *